з,767,745
Patented Oct. 23, 1973

3,767,745
HOT PRESSING CERAMIC OXIDES TO TRANSPARENCY BY HEATING IN ISOTHERMAL INCREMENTS
George E. Gazza, Sudbury, and Sunil K. Dutta, Waltham, Mass., assignors to the United States of America as represented by the Secretary of the Army
No Drawing. Continuation-in-part of abandoned application Ser. No. 81,612, Oct. 16, 1970. This application Feb. 7, 1972, Ser. No. 224,244
Int. Cl. C04b 35/64, 35/24, 35/44
U.S. Cl. 264—65           3 Claims

ABSTRACT OF THE DISCLOSURE

A pressure sintering process for the fabrication of ultrafine grained ceramics having improved strength and enhanced transparency comprising the cold compressing of a ceramic oxide powder having a cubic crystal structure, removing undesired gases, raising to a temperature at which full density of the compact can be obtained in isothermal increments of about 50° under elevated pressures while maintaining the temperature at each incremental increase for a period of about 50–60 minutes, and recovering the product. Materials having a cubic crystal structure such as $MgAl_2O_4$, $LiAl_5O_8$, $Y_3Al_5O_{12}$, MgO and ZnO are suitable for hot pressing in this process.

---

This application is a continuation-in-part of Ser. No. 81,612, filed Oct. 16, 1970 and now abandoned.

The invention described herein may be manufactured, used, and licensed by or for the Government for governmental purposes without the payment to us of any royalty thereon.

This invention relates to a method for the fabrication of ultrafine grained ceramics having improved strength and transparency comprising the heating of a ceramic oxide having a cubic crystal structure in isothermal increments under elevated pressures.

It is an object of this invention to provide and disclose a vacuum hot pressing method for the fabrication of ultrafine grained ceramics having improved strength.

It is a further object of this invention to provide and disclose a vacuum hot pressed method for the fabrication of ultrafine grained ceramics having enhanced transparency without the utilization of additives as sintering aids or grain growth inhibitors.

Other objects and a fuller understanding of the invention may be had by referring to the following description and claims.

The present ultrafine grained ceramics were fabricated, as described below, utilizing a ceramic oxide powder having a cubic crystal structure, Example 1 describes the preparation of a ceramic utilizing magnesium aluminate in accordance with the present method, i.e., incremental heating. In comparison with Example 1, the magnesium aluminate was heated directly to a temperature of 1500° C., as described in Examples 2 and 3. The desired product of Example 1 was not obtained. Example 4 describes the preparation of a ceramic utilizing lithium aluminate in accordance with the present method. In comparison with Example 4, the lithium aluminate was heated directly as described in Example 5. The desired product of Example 4 was not obtained.

EXAMPLE 1

In operation, commercially available (W. R. Grace) magnesium aluminate ($MgAl_2O_4$) having a purity of 99.90 to about 99.99%, and a particle size of about 1 micron is cold pressed into discs by any conventional means to about 40–50% of theoretical density. The cold pressed magnesium aluminate compact is loaded into a conventional vacuum hot press graphite die which has been lined with molybdenum. The die comprises a graphite top punch and a graphite bottom punch. A molybdenum spacer, which is 1" in diameter by 0.02" thickness, is positioned between the magnesium aluminate compact and the graphite top punch and the magnesium aluminate compact and the bottom punch in order to inhibit undesirable reactions between the magnesium aluminate and the graphite. The vacuum chamber is evacuated and the temperature gradually raised to around 600° C. The temperature is maintained at around 600° C. for a period of approximately 1 hour in order to remove undesired gases. An indication that the "outgassing" is complete is when a steady vacuum of $10^{-5}$ torr can be maintained in the chamber. The temperature is then raised to about 1150° C. and a pressure of 6000 p.s.i. is applied. A pressure range of 6000–7000 p.s.i. has been found operable. The temperature is held at 1150° C. for a period of about 60 minutes and then raised in 50° C. increments until a temperature of around 1500° C. is reached. The temperature is maintained at each 50° increment for a period of about 60 minutes. A temperature range holding time of 50–60 minutes has been found operable. The ceramic material is maintained at a temperature of around 1500° C. for a period of 120 minutes. The die is then slowly cooled until a temperature of about 1300° C. is reached. The pressure is then released and the die is allowed to cool to room temperature.

A transparent magnesium aluminate spinel 1" in diameter and ⅛" in thickness having a grain size of approximately 1 micron was obtained. It has been established from known strength-grain size relationship with ceramic materials that ultrafine grain sizes are important for improved strength. In addition, an unusually high degree of transgranular fracture was observed from electron fractograph which indicated a potentially high fracture energy.

EXAMPLE 2

A cold compacted sample of magnesium aluminate was positioned in a conventional vacuum hot press graphite die and degassed as described in Example 1. A pressure of around 6000 p.s.i. was applied and the die was heated directly to 1500° C. The die was maintained at a temperature of 1500° C. for a period of around 120 minutes. The die was slowly cooled until a temperature of about 1300° C. was reached. The pressure was then released and the die allowed to cool to room temperature and the product recovered. A nontransparent magnesium aluminate spinel disc was obtained. In addition the grain sizes of the product were larger than the grain sizes of the product of Example 1.

EXAMPLE 3

The process of Example 2 was repeated with the exception that a pressure of 6000 p.s.i. was applied after heating directly to 1500° C. A nontransparent magnesium aluminate spinel disc was obtained. In addition, the grain sizes of the product was larger than the grain sizes of the product of Example 1.

EXAMPLE 4

The process of Example 1 was carried out utilizing lithium aluminate ($LiAl_5O_8$). The lithium aluminate was prepared by mixing 1.37 grams of $Li_2CO_3$ (0.019 mole) and 69.51 grams of $Al(NO_3)_3 \cdot 9H_2O$ (0.186 mole). Sufficient water was added to completely dissolve the salts. The resultant mixed aqueous salt solution was injected into liquid nitrogen to form frozen spheroids. The frozen spheroids were then immersed in a solution of ammonium hydroxide maintained at a temperature no higher than 5° C. to precipitate the mixed-cation hydroxides. The precipitate was recovered by decantation and dried at low temperatures, e.g., with infrared lamps. The dry powder was calcined by heating in air at a temperature of less than 1000° C. A product having a particle size of about 1 micron was obtained.

The above prepared lithium aluminate was cold pressed into discs to about 40–50% of theoretical density. The discs subjected to the identical conditions set forth in Example 1, with the exception that the die was heated in isothermal increments to a temperature of 1600° C. instead of 1500° C. A transparent ultrafine grain ceramic having a grained size of about 1 micron was recovered.

EXAMPLE 5

The process of Example 4 was repeated with the exception that after the removal of undesired gases from the ceramic material, a pressure of 6000 p.s.i. was applied and the die was heated directly to 1600° C. A nontransparent ceramic material was obtained.

In addition to $MgAl_2O_4$ and $LiAl_5O_8$, it is contemplated that the present process can be utilized to promote ultrafine grains, high strength and transparency in other ceramic oxides having a cubic crystal e.g., $Y_3Al_5O_{12}$, MgO and ZnO. Of course, particular parameters such as temperature sintering range and time at specific incremental temperature may vary depending on the particular oxide system being utilized.

Possible applications of the ceramic material include high intensity lamps, infrared windows for heat seeking rockets, windows for high temperature application, and development of transparent armor for ground vehicles.

Although we have described our invention with a certain degree of particularity, we wish it to be understood that we do not desire to be limited to the exact details shown and described in that obvious modifications will occur to a person skilled in the art.

Having described our invention, we claim:

1. In a method of making transparent, ultrafine grained ceramic body comprising the steps of cold pressing a ceramic oxide powder to form a compact followed by hot pressing the compact; the improvement comprising the steps of, (a) selecting as the ceramic oxide powder a material having a cubic crystal structure selected from the group consisting of magnesium aluminate, lithium aluminate, yttria aluminate, magnesium oxide and zinc oxide.
   (b) cold compressing the ceramic powder to about 40–50% of theoretical density to form a compact,
   (c) heating the compact under a vacuum to about 600° C. in order to remove undesired gases,
   (d) raising to a temperature at which full density of the compact can be obtained in isothermal increments of about 50° C. under pressures of around 6000–7000 p.s.i. while maintaining the temperature at each incremental increase for a period of about 50–60 minutes, and recovering the product having a grain of about 1 micron.

2. A method in accordance with claim 1 wherein the ceramic oxide is magnesium aluminate, and the temperature is raised in 50° C. increments commencing at 1150° C. and ending at 1500° C.

3. A method in accordance with claim 1 wherein the ceramic oxide is lithium aluminate, and the temperature is raised in 50° C. increments commencing at 1150° C. and ending at 1600° C.

References Cited

UNITED STATES PATENTS

| | | | |
|---|---|---|---|
| 3,530,209 | 9/1970 | Ho | 264—332 |
| 3,277,287 | 10/1966 | Spriggs et al. | 264—332 |
| 3,531,308 | 9/1970 | Bagler | 106—62 |

OTHER REFERENCES

J. E. Burke, Progress in Ceramic Science, vol. 4, Pergamon Press, New York, 1963, at 101.

JOHN H. MILLER, Primary Examiner

U.S. Cl. X.R.

264—66, 332